(12) United States Patent
Firestone

(10) Patent No.: US 6,634,680 B1
(45) Date of Patent: Oct. 21, 2003

(54) STOP KNOT KEY AID

(76) Inventor: John R. Firestone, 5188 W. 625 North, Wawaka, IN (US) 46794

( * ) Notice: Subject to any disclaimer, the term of this patent is extended or adjusted under 35 U.S.C. 154(b) by 0 days.

(21) Appl. No.: 10/156,561

(22) Filed: May 24, 2002

Related U.S. Application Data

(60) Provisional application No. 60/292,479, filed on May 22, 2001.

(51) Int. Cl.$^7$ ................................................. D03J 3/00
(52) U.S. Cl. ........................................................ 289/17
(58) Field of Search ..................... 289/17, 18.1, 1.2, 289/1.5, 2, 13, 15; 43/1, 4

(56) References Cited

U.S. PATENT DOCUMENTS

| | | | |
|---|---|---|---|
| 2,689,147 A | * 9/1954 | Smalley | ......................... 289/17 |
| 2,697,624 A | * 12/1954 | Thomas et al. | ................ 289/17 |
| 2,992,029 A | 7/1961 | Russell | |
| 3,106,417 A | * 10/1963 | Clow | ........................... 289/17 |
| 3,252,724 A | 5/1966 | Kearns | |
| 3,630,555 A | 12/1971 | Newlin | |
| 3,837,691 A | 9/1974 | Smythe | |
| 4,101,152 A | 7/1978 | Gardipee | |
| 4,864,762 A | * 9/1989 | Cox | ............................. 289/17 |
| 5,098,137 A | 3/1992 | Wardall | |
| 5,593,189 A | 1/1997 | Little | |
| 5,829,798 A | 11/1998 | Little | |
| 5,971,447 A | * 10/1999 | Steck, III | ..................... 289/17 |

* cited by examiner

Primary Examiner—Gary L. Welch
(74) Attorney, Agent, or Firm—Jeffrey Weiss; Craig Weiss; Weiss, Moy & Harris, P.C.

(57) ABSTRACT

An aid and method for tying fishing knots. A substantially key-shaped aid has a flat head, a shank having a groove therein, and a notch in the shank. The groove permits the tying of a knot across the shank, and over an object—either a line passed through the groove or a hook positioned under the shank—to which the knot is to be attached.

8 Claims, 2 Drawing Sheets

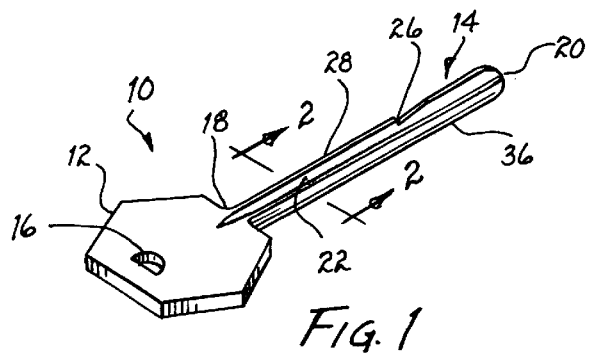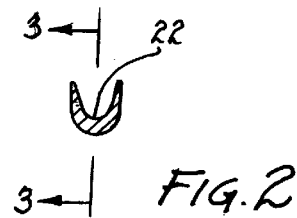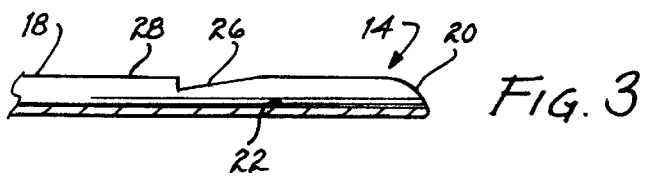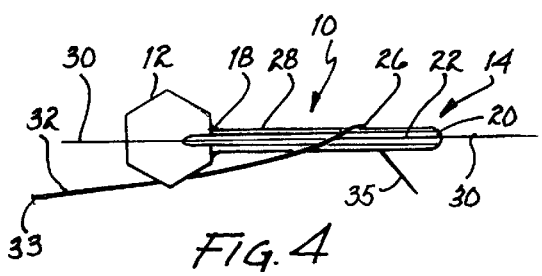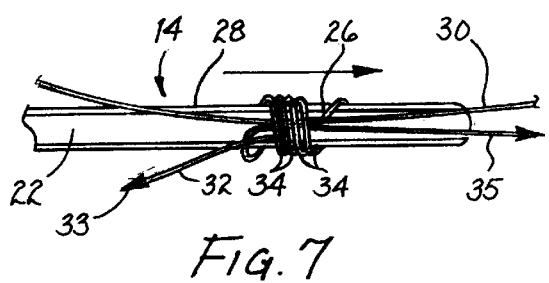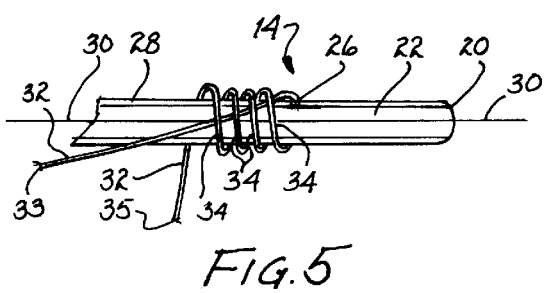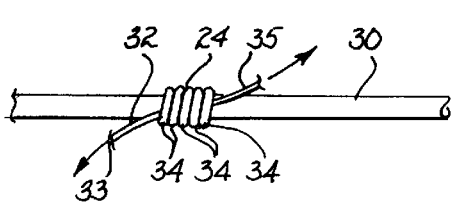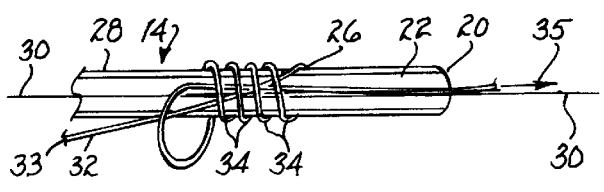

US 6,634,680 B1

STOP KNOT KEY AID

RELATED APPLICATIONS

This non-provisional application claims priority from provisional application No. 60/292,479, filed on May 22, 2001.

FIELD OF THE INVENTION

This invention relates generally to the tying of knots for fishing and, more particularly to a knot tying aid and method for use with different types of fishing line.

BACKGROUND OF THE INVENTION

The tying of knots is an integral part of fishing. These may be needed for purposes of positioning a bobber on a line, to attach a leader, or to snell a hook. It is desired to be able to tie the knot necessary for a particular task in a relatively quick and easy manner. It is also desired to be able to tie the knot necessary for a particular.task in a manner that limits the amount of cutting of the line.

SUMMARY OF THE INVENTION

It is an object of the present invention to provide an aid and method that may be utilized for the efficient tying of certain types of fishing knots.

It is a further object of the present invention to provide an aid and method that may be utilized to install a moveable bobber/float stop on a fishing line without cutting and re-rigging the fishing line.

It is a still further object of the present invention to provide an aid and method that may be utilized to install a leader on a line without cutting and re-rigging the line.

It is yet a further object of the present invent to provide an aid and method that will permit the snelling of a fishing hook.

BRIEF DESCRIPTION OF THE PREFERRED EMBODIMENTS

In accordance with one embodiment of the present invention, a knot tying aid for use with fishing line is disclosed. The aid comprises, in combination: a flat head; a shank fixedly coupled to the flat head; wherein the shank has a first end proximate the flat head, a second end, and an upward-opening groove along a length thereof, so as to impart a substantially U-shape to the shank when viewed from the second end; a notch on an upper surface of the shank, formed into a wall surrounding the groove; wherein the notch is angled in a direction from the second end to the flat head so that the notch is deeper proximate the flat head than proximate the second end; one of a length of fishing line and fly line dimensioned to be inserted into the groove; and one of a knot string and a leader dimensioned to be hooked into the notch.

In accordance with another embodiment of the present invention, a method for tying a knot comprising the steps of: providing a flat head; providing a shank fixedly coupled to the flat head; wherein the shank has a first end proximate the flat head, a second end, and an upward-opening groove along a length thereof, so as to impart a substantially U-shape to the shank when viewed from the second end; providing a notch on an upper surface of the shank, formed into a wall surrounding the groove; wherein the notch is angled in a direction from the second end to the flat head so that the notch is deeper proximate the flat head than proximate the second end; providing a length of one of a fishing line and a fly line dimensioned to be inserted into the groove; providing one of a knot string and a leader dimensioned to be hooked into the notch and wherein the one of a knot string and a leader has a first end and a second end; holding the flat head; inserting the one of a fishing line and the fly line into the groove; grasping the first end of the one of a knot string and a leader; extending the second end of the one of a knot string and a leader across the shank, hooking the one of a knot string and a leader into the notch, and wrapping the one of a knot string and a leader around the shank a plurality of times so that the second end of the one of a knot string and a leader passes over a portion of the one of a knot string and a leader that has been extending across the shank; holding the one of a fishing line and a fly line and the one of a knot string and a leader in place in the groove and the notch; inserting the second end of the one of a knot string and a leader into the groove and under wrapped portions of the one of a knot string and a leader; pulling the second end of the one of a knot string and a leader until the wrapped portions of the one of a knot string and a leader are slightly tightened; separating the knot tying aid from the one of a knot string and a leader and the one of a fishing line and a fly line; and pulling on the first end and the second end of the one of a knot string and a leader.

In accordance with a still further embodiment of the present invention, a method for tying a knot is disclosed. The method comprises the steps of: providing a flat head; providing a shank fixedly coupled to the flat head; wherein the shank has a first end proximate the flat head, a second end, and an upward-opening groove along a length thereof, so as to impart a substantially U-shape to the shank when viewed from the second end; providing a notch on an upper surface of the shank, formed into a wall surrounding the groove; wherein the notch is angled in a direction from the second end to the flat head so that the notch is deeper proximate the flat head than proximate the second end; providing a rod line dimensioned to be hooked into the notch and wherein the rod line has a first end and a second end; providing a hook having an eye at an end thereof; placing the hook against a bottom side of the shank opposite the groove so that the eye is proximate the first end of the shank; threading the rod line through the eye, extending the rod line across the shank, hooking the rod line into the notch, and wrapping the rod line around the shank, the rod line, and the hook a plurality of times; inserting the second end of the rod line into the groove proximate the first end of the shank and under wrapped portions of the rod line; separating the knot tying aid from the rod line and the hook; sliding the wrapped portions along the hook to a point proximate the eye; and pulling on the first end and the second end of the rod line.

BRIEF DESCRIPTION OF THE DRAWINGS

FIG. 1 is a perspective view of the preferred embodiment of the stop knot key aid of the present invention.

FIG. 2 is an end cross-sectional view of the stop knot key aid of FIG. 1 taken along line 2—2.

FIG. 3 is a side view of the shank portion of the stop knot key aid, showing a notch therein, taken along line 3—3 of FIG. 2.

FIG. 4 is a top view of the stop knot key aid of the present invention, showing one of a leader line and a knot string inserted into the notch.

FIG. 5 is a top view of the shank portion of the stop knot key aid, showing the one of a leader line and a knot string wrapped several times around the shank.

FIG. 6 is a top view of the shank portion of the stop knot key aid, showing the one of a leader line and a knot string wrapped several times around the shank and re-inserted under the wrapped portions through the groove and away from the flat end.

FIG. 7 is a top view of the shank portion of the stop knot key aid, showing one of a fishing line and a fly line inserted through the groove under the one of a leader line and a knot string.

FIG. 8 is a side view of the one of a fishing line and a fly line, showing the one of a leader line and a knot string tied in a knot around the one of a fishing line and a fly line.

DETAILED DESCRIPTION OF THE PREFERRED EMBODIMENTS

Figure 9:
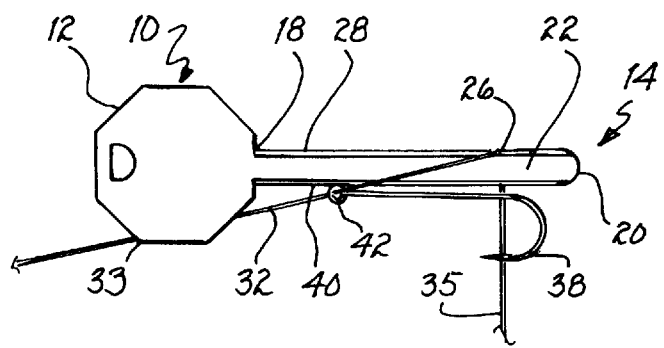
FIG. 9 is a top view of the stop knot key aid of the present invention, showing a rod line inserted through the eye of a hook and wrapped around the shank.

Referring to FIGS. 1 and 4, the stop knot key aid, hereinafter stop knot key aid 10, of the present invention is shown. The stop knot key aid 10 is substantially key-shaped and comprises a flat head 12 fixedly coupled to a shank 14.

Preferably the flat head 12 end defines an aperture 16 (shown in FIG. 1) to facilitate coupling of the stop knot key aid 10 to a key chain, clip, string, or the like (not shown).

Referring now to FIGS. 1 and 3–7, the shank 14 of the stop knot key aid 10 has a.first end 18 (shown in FIGS. 1, 3 and 4), a second end 20 and an upward-opening groove 22 the length thereof, so as to impart a substantially U-shape to the shank 14 when viewed from the end 20 (see FIG. 2). The shank 14 further defines a notch 26 on a raised portion 28 of the top side of the shank 14.

One purpose of the stop key aid 10 as illustrated in FIGS. 4–8 is to install a.moveable bobber/float stop knot 24 on a fishing line 30 and to re-install the bobber/float stop without cutting and re-rigging the fishing line 30. To accomplish this task, one may or may not rig the line 30 for fishing. Preferably, the flat head 12 of the stop knot key aid 10 is held in the left hand between the thumb and middle phalanges of the index finger, although it should be understood that the stop knot key aid 10 could be secured in an alternative position. A fishing line 30 must be inserted into the groove 22. Then, a piece of knot string 32 (shown in FIGS. 4–8) having a first end 33 and a second end 35 should be hooked into the notch 26 of the stop knot key aid 10. Preferably, the knot string 32 is six to ten inches in length, although it should be understood that substantial benefit could be derived from a knot string 32 which deviates, even substantially, from the preferred length in either direction. Preferably, one holds the fishing line 30, the knot string 32 and the stop knot key aid 10 in place between the thumb and index finger, although an alternative position may be used so long as the stop knot key aid 10, the fishing line 30, and the knot string 32 can all be held together securely.

In the preferred embodiment, the finger tip of the index finger can be used to hold the second end 35 of the knot string 32 and wraps of the knot 24 against the back side 36 (shown in FIG. 1) of the knot stop key aid 10 to keep the knot 24 from unwrapping.

Referring now to FIG. 6, the second end 35 of the knot string 32 should then be inserted into the groove 22 at the first end 18 of the shank 14 and fed under the wraps 34 toward the second end 20 of the shank 14.

Referring now to FIG. 7, once passed under the wraps 34, the second end 35 of the knot string 32 is preferably pulled until the wraps 34 are slightly tightened.

Referring now to FIG. 8, the stop knot key aid 10 is removed leaving the knot 24 loosely coupled to the fishing line 30. In the preferred embodiment, one can accomplish this task by pinching the wraps 34 between the right thumb and the index finger and sliding the stop knot key aid 10 out of the knot 24.

Once this is done, the knot 24 should be tightened onto the fishing line 30 by pulling both the first end 33 and the second end 35 of the knot string 32. After this, both the first end 33 and the second end 35 of the knot string 32 should be trimmed to approximately ⅛inch from the knot 24.

Referring a second time to FIGS. 4–8, in order to use the stop knot key aid 10 to attach leaders, a substantially similar method is used. In this embodiment, reference number 32 refers to the leader, which one should take and hook into the notch 26. Next, the second end 35 of the leader 32 should be wrapped around the shank 14 preferably six to eight times, although it should be clearly understood that substantial benefit could be derived from an alternate number of wraps 34 which deviates, even substantially, from the preferred number of wraps 34 in either direction.

In this embodiment, reference number 30 refers to a fly line, which should then be inserted into the groove 22 of the stop knot key aid 10. This time, however, the fly line 30 should be inserted from the second end 20 of the shank 14 towards the first end 18 of the shank 14. Preferably, the fly line 30 should extend approximately 4 inches beyond the wraps 34, although it should be clearly understood that substantial benefit could be derived from the extension of a fly line which deviates, even substantially, from the preferred 4 inch extension in either direction. Once again, the stop knot key aid 10 is removed, leaving the knot 24 loosely coupled to the fly line 30. The knot wraps 34 should be tightened around the fly line 30 so that the knot wraps 34 stay in position, but not so tight that the knot wraps 34 cannot slide on the fly line 30. The fly line 30 should then be pulled through the knot 24 until the knot 24 is approximately a half inch from the end of the fly line 30. Once this is done, the knot 24 should be tightened onto the fly line 30 by pulling both the first end 33 and the second end 35 of the leader line 32, while making sure not to let the wraps 34 overlap. Preferably, the second end 35 of the leader line 32 should be trimmed flush from the knot 24, and the short end of the fly line 30 should be trimmed flush from the knot 24.

Figure 10:
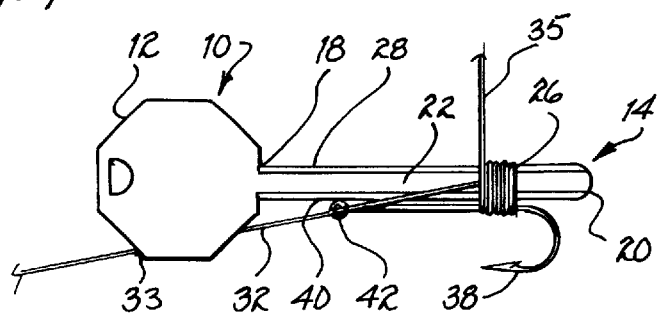
FIG. 10 is a top view of the stop knot key aid of the present invention, showing a stop knot wrapped around a hook.
Figure 11:
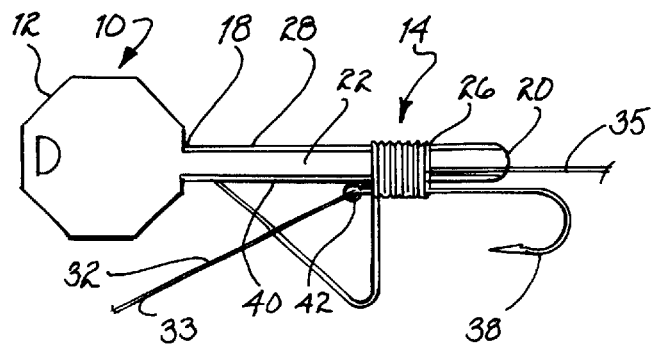
FIG. 11 is a top view of the stop knot key aid of the present invention, showing a stop knot wrapped around a hook and the rod line reinserted under the stop knot.

Referring now to FIGS. 9–11, the stop knot key aid 10 can also be used to snell a hook 38. Referring now to FIG. 9, a hook 38 is placed against the bottom side 40 of the shank 14 opposite the notch 26. The eye 42 of the hook 38 should be pointed towards the first end 18 of the shank 14. One threads a second end 35 of a rod line 32 through the eye 42 of the hook 38 and then wraps the second end 35 of the rod line 32 around the notch 26 to form a stop knot 24 in substantially the same fashion as done in forming the bobber stop knot described above.

Referring now to FIGS. 10–11, the wraps 34 should not be so tight as to make insertion of the second end 35 of the rod line 32 under the wraps 34 difficult. The second end 35 of the rod line 32 should be inserted into the groove 22 under the wraps 34 from the direction of the first end 18 of the shank 14 towards the second end 20 of the shank 14. The stop knot key aid 10 is removed leaving the knot 24 loosely coupled to the hook 38. Once this is done, the knot 24, tightened lightly to the shank of the hook 38, should be slid up to the eye 42 of the hook 38 and tightened securely by pulling both the first end 33 and the second end 35 of the rod line 32.

In addition to creating a stop knot 24 on a fishing line 30, attaching a leader 32 to a fly line 30, and snelling a hook 38, one may use the stop knot key aid 10 key to join two pieces of fishing line together or couple other fishing items to various types of lines.

I claim:

1. A method for tying a knot comprising the steps of:

providing a flat head;

providing a shank fixedly coupled to said flat head;

wherein said shank has a first end proximate said flat head, a second end, and an upward-opening groove along a length thereof, so as to impart a substantially U-shape to said shank when viewed from said second end;

providing a notch on an upper surface of said shank, formed into a wall surrounding said groove;

wherein said notch is angled in a direction from said second end to said flat head so that said notch is deeper proximate said flat head than proximate said second end;

providing a length of one of a fishing line and a fly line dimensioned to be inserted into said groove;

providing one of a knot string and a leader dimensioned to be hooked into said notch and wherein said one of a knot string and a leader has a first end and a second end;

holding said flat head;

inserting said one of a fishing line and said fly line into said groove;

grasping said first end of said one of a knot string and a leader;

extending said second end of said one of a knot string and a leader across said shank, hooking said one of a knot string and a leader into said notch, and wrapping said one of a knot string and a leader around said shank a plurality of times so that said second end of said one of a knot string and a leader passes over a portion of said one of a knot string and a leader that has been extending across said shank;

holding said one of a fishing line and a fly line and said one of a knot string and a leader in place in said groove and said notch;

inserting said second end of said one of a knot string and a leader into said groove and under wrapped portions of said one of a knot string and a leader;

pulling said second end of said one of a knot string and a leader until said wrapped portions of said one of a knot string and a leader are slightly tightened;

separating said knot tying aid from said one of a knot string and a leader and said one of a fishing line and a fly line; and pulling on said first end and said second end of said one of a knot string and a leader.

2. The method of claim 1 wherein said step of holding said flat head comprises the step of holding said flat head between a user's thumb and middle phalanges of the index finger.

3. The method of claim 1 wherein said step of holding said one of a fishing line and a fly line and said one of a knot string and a leader in place in said groove and said notch comprises the step of holding said one of a fishing line and a fly line, said one of a knot string and a leader and said knot tying aid between a user's thumb and index finger.

4. The method of claim 1 wherein said step of separating said knot tying aid from said one of a knot string and a leader and said one of a fishing line and a fly line comprises the step of pinching said wrapped portions of said one of a knot string and a leader between a user's right thumb and index finger and sliding said knot tying aid out.

5. The method of claim 1 further comprising the step of trimming said first end and said second end of said one of a knot string and a leader to approximately one-eighth of one inch from said wrapped portions.

6. The method of claim 1 wherein said one of a knot string and a leader is wrapped around said shank between about six and eight times.

7. The method of claim 1 further comprising the steps of:

pulling said one of a fishing line and a fly line until said wrapped portions are about one-half inch from an end of said one of a fishing line and a fly line; and trimming said second end of said one of a knot string and a leader flush with an end of said wrapped portions.

8. A method for tying a knot comprising the steps of:

providing a flat head;

providing a shank fixedly coupled to said flat head;

wherein said shank has a first end proximate said flat head, a second end, and an upward-opening groove along a length thereof, so as to impart a substantially U-shape to said shank when viewed from said second end;

providing a notch on an upper surface of said shank, formed into a wall surrounding said groove;

wherein said notch is angled in a direction from said second end to said flat head so that said notch is deeper proximate said flat head than proximate said second end;

providing a rod line dimensioned to be hooked into said notch and wherein said rod line has a first end and a second end;

providing a hook having an eye at an end thereof;

placing said hook against a bottom side of said shank opposite said groove so that said eye is proximate said first end of said shank;

threading said rod line through said eye, extending said rod line across said shank, hooking said rod line into said notch, and wrapping said rod line around said shank, said rod line, and said hook a plurality of times;

inserting said second end of said rod line into said groove proximate said first end of said shank and under wrapped portions of said rod line;

separating said knot tying aid from said rod line and said hook;

sliding said wrapped portions along said hook to a point proximate said eye; and pulling on said first end and said second end of said rod line.

* * * * *